United States Patent [19]

Gulczynski

[11] Patent Number: 5,267,132
[45] Date of Patent: Nov. 30, 1993

[54] HIGH POWER SWITCHING POWER SUPPLY WITH HIGH POWER FACTOR

[76] Inventor: Zdzislaw Gulczynski, P.O. Box 441, Winchester, Mass. 01890

[21] Appl. No.: 304,508

[22] Filed: Jan. 31, 1989

[51] Int. Cl.$^5$ ............................................. H02M 3/335
[52] U.S. Cl. ........................................ 363/16; 363/80
[58] Field of Search ...................... 363/15, 16, 37, 80, 363/86, 89, 50; 323/266, 222, 224

[56] References Cited

U.S. PATENT DOCUMENTS 4,092,712  5/1978  Harrigill, Jr. et al. ................. 363/16
4,692,851  9/1987  Attwood ................................ 363/16

*Primary Examiner*—Peter S. Wong

[57] ABSTRACT

The switching power supply has a high output power, high efficiency and extremely high power factor. The input signal may be AC or DC. A charging circuit operates independently, whereby an average sinusoidal input current is obtained. No separate power factor correction circuit is employed. The switching power supply includes a transformer coupled to ground for providing the output signal. A pair of capacitors is coupled to ground for storing a pair of voltages having opposite polarities. Two switches successively apply the capacitor voltages across primary of the transformer. A rectifier applies the input voltage to one capacitor. The charging circuit inverts a polarity of the input voltage and charges the other capacitor.

11 Claims, 3 Drawing Sheets

HIGH POWER SWITCHING POWER SUPPLY WITH HIGH POWER FACTOR

CROSS REFERENCE TO RELATED INVENTIONS

This invention is related to the following inventions by the same inventor:

"Switching Power Apparatus Having High Power Factor and Comprising Pair of Converters for Obtaining Fixed or Variable Output Voltage" Ser. No. 665,950 filed Mar. 11, 1991;

"Ultra Efficient Resonant Switching Power Apparatus" Ser. No. 632,546 filed Dec. 24, 1990;

"Switching Power Apparatus with 3-State Driver" Ser. No. 517,853 filed May 2, 1990;

"Bidirectional Switching Power Apparatus with AC or DC Output" Ser. No. 518,080 filed May 2, 1990;

"Capacitive Load Driver with Binary Output" Ser. No. 474,488 filed Feb. 2, 1990;

"3-Terminal Bidirectional Switching Power Supply with AC or DC Input and AC or DC Output" Ser. No. 444,729 filed Dec. 1, 1989;

"Switching Power Supply with Constant or Sinusoidal Input Current and with Fixed or Variable Output Voltage" Ser. No. 444,730 filed Dec. 1, 1989;

"Switching Power Supply with Constant or Sinusoidal Input Current" Ser. No. 393,391 filed Aug. 14, 1989;

"Switching Power Supply Comprising Pair of Converters for Obtaining Constant or Sinusoidal Input Current and Fixed or Variable Output Voltage" U.S. Pat. No. 4,999,568 dated Mar. 12, 1991;

"Ultra Efficient Switching Power Amplifier" U.S. Pat. No. 4,980,649 dated Dec. 25, 1990;

"Synchronous Switching Power Supply Comprising Buck Converter" Ser. No. 363,325 filed Jun. 8, 1989;

"Synchronous Switching Power Supply Comprising Boost or Flyback Converter" Ser. No. 363,326 filed Jun. 8, 1989;

"Synchronous Switching Power Supply with Boost and/or Flyback Converters" Ser. No. 363,327 filed Jun. 8, 1989;

"High Power Switching Power Supply" U.S. Pat. No. 4,947,308 dated Aug. 7, 1990;

"High Efficiency Power Factor Correction Circuit" U.S. Pat. No. 4,949,234 dated Aug. 14, 1990;

"Ladderless True Flash Analog-to-Digital Converter with Automatic Calibration" Ser. No. 304,505 filed Jan. 31, 1989 herewith;

"Segmented Encoder and Digital Memory Particularly for Flash Analog-to-Digital Converters" Ser. No. 304,506 filed Jan. 31, 1989 herewith;

"Ultra Fast Digital-to-Analog Converter with Independent Bit Current Source Calibration" filed herewith, now U.S. Pat. No. 4,958,155 dated Sep. 18, 1990;

"High Power Switching Power Supply Having High Power Factor" filed herewith, now U.S. Pat. No. 4,956,760 dated Sep. 11, 1990;

"High Accuracy Reference Ladder" filed herewith, now U.S. Pat. No. 4,929,848 dated May 29, 1990;

"Power Switch Driver" U.S. Pat. No. 4,940,906 dated Jul. 10, 1990;

"Synchronous Switching Power Supply with Flyback Converter" U.S. Pat. No. 4,853,837 dated Aug. 1, 1989;

"High Efficiency Power Amplifier Comprising Multilevel Power Supply" U.S. Pat. No. 4,871,980 dated Oct. 3, 1989;

"Switching Power Amplifier" U.S. Pat. No. 4,763,080 dated Aug. 9, 1988;

"Switching Circuits Performing Thyristor and Triac Functions" U.S. Pat. No. 4,845,391 dated Jul. 4, 1989;

"Switching Power Supply" U.S. Pat. No. 4,803,610 dated Feb. 7, 1989; and

"Switching Power Supply" U.S. Pat. No. 4,736,286 dated Apr. 5, 1988.

BACKGROUND OF THE INVENTION

The invention relates to switching power supply (SPS) receiving AC line voltage or DC voltage, particularly for power supply systems requiring high output power, high efficiency and extremely high power factor.

Conventional SPSs convert AC energy source, e.g. line, into DC voltage. In particular, the AC voltage is rectified and further applied to an input capacitor. Charging the capacitor causes inrush current and surge currents every peak of the AC voltage. Pulse width modulation (PWM) is used which results in numerous problems including high circuit complexity, stability problems and significantly higher effective switching frequency. Numerous interference suppressors and protection circuits are inevitable. Power factor correction circuits are employed which further increase complexity and decrease efficiency.

Power factor correction circuits employ a boost switching circuit. Rectified line voltage is applied thereto. Therefore, switching frequency or PWM varies in a large range. The circuit is practically inoperative near line voltage crossover. The voltage provided by the boost circuit is inherently greater than the peak of the line voltage. This value is especially large e.g. in European countries. A troublesome mechanical switch for reducing capacitor voltages is employed. The power factor correction circuit operates as separate input unit and is excluded from the power conversion itself. In particular, the correction circuit must sustain a full power of the SPS. Moreover, the inrush current is inevitable.

Power factor well defines performance of an SPS. It is a ratio of the SPS output power over input power. The input power is input AC voltage multiplied by RMS input current. The power factor is often specified only for the correction circuit. In fact, the power factor depends on efficiency of the entire SPS. An exemplary approach to a high efficiency SPS is disclosed in the abovementioned U.S. Pat. No. 4,736,286 entitled "Switching Power Supply" dated Apr. 5, 1988, by the same inventor. The SFSs disclosed therein convert AC signal into AC and/or DC signal while employing a minimum number of switching and inductive components. In particular, FIG. 3a embodiment disclosed in U.S. Pat. No. 4,736,286 has no input capacitor and employs a single inductive component coupled to ground.

SUMMARY OF THE INVENTION

The present invention is intended to provide an SPS having a high output power, high efficiency and extremely high power factor. The input signal may be AC or DC. The high power and high efficiency are achieved by successively applying voltages of opposite polarities across primary of a power transformer, wherein only one transistor is activated. Another transistor switch operates independently, whereby a sinusoidal input current and high power factor are obtained. No separate power factor correction circuit is employed. Inrush, surge currents and voltage spikes are eliminated. The primary is coupled to ground so that transformer current, including short circuit current, can be easy monitored.

SPS according to the present invention converts input signal into output signal and comprises an inductive means coupled to ground for providing the output signal, a pair of capacitive means coupled to ground for storing a pair of voltages having opposite polarities, a switch means for alternatively applying one or the other voltage to the inductive means, a rectifying means for rectifying and applying the input signal to the inductive means and/or to one capacitive means, and a charging means for inverting a polarity of the input signal and charging the other capacitive means.

In another embodiment the rectifying means includes a second switch means for applying the input signal to the inductive means.

Flyback converter is one of three basic configurations for converting a predetermined DC input voltage into a desired DC output voltage. The flyback converter inverts the input voltage and comprises switch, diode and inductor tied together and further coupled to the converter input, output and ground respectively. For instance, if the input voltage is positive, the output voltage is negative, wherein the diode has anode coupled to the output.

BRIEF DESCRIPTION OF THE DRAWINGS

The present invention will become more clear in conjunction with the accompanying FIGURES throughout which similar references denote similar parts and of which.

DETAILED DESCRIPTION OF THE INVENTION

Figure 1:
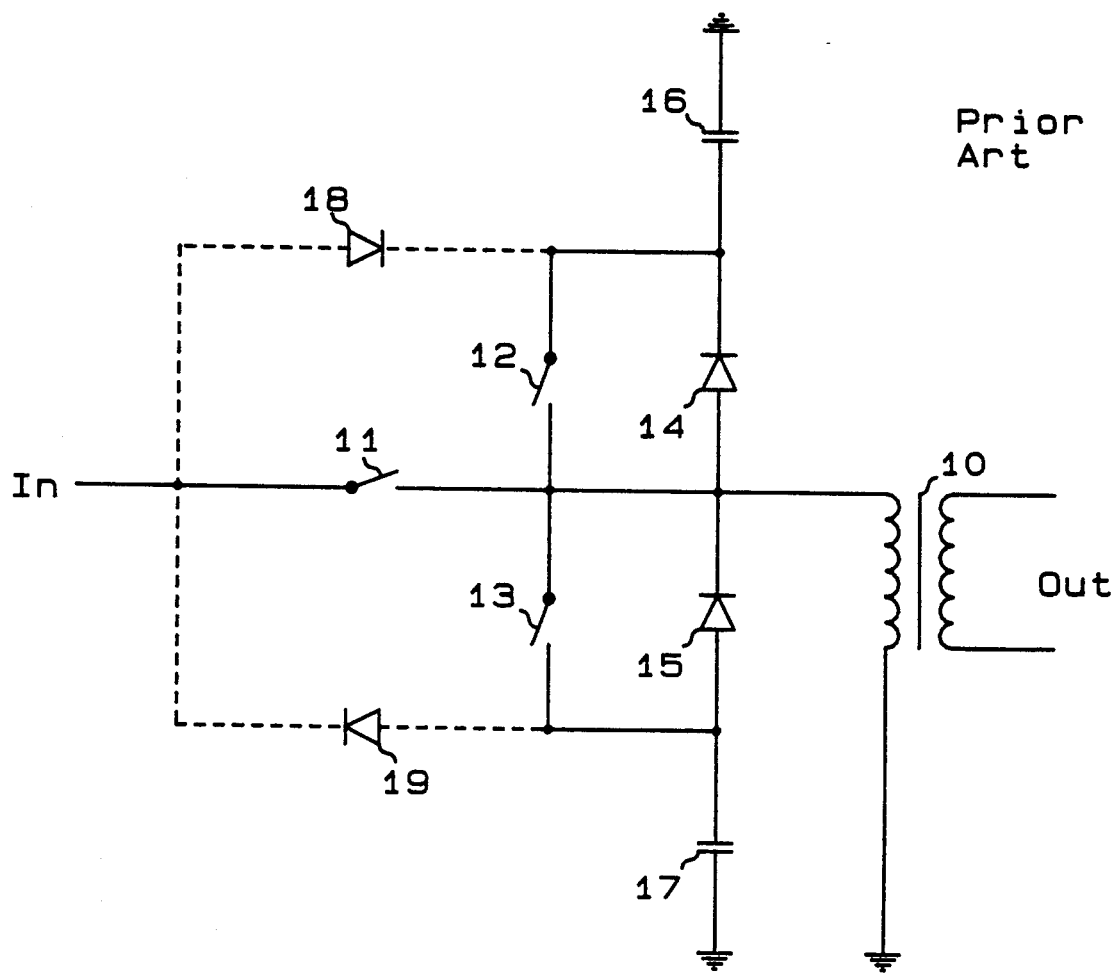
FIG. 1 is embodiment of high power SPS based on FIG. 3a disclosed in the aforementioned "Switching Power Supply" U.S. Pat. No. 4,736,286 dated Apr. 5, 1988, by the same inventor.

FIG. 1 is embodiment of high power SPS based on FIG. 3a disclosed in the aforementioned "Switching Power Supply" U.S. Pat. No. 4,736,286 dated Apr. 5, 1988, by the same inventor. The input voltage is AC, e.g. line voltage. The SPS comprises the transformer 10 having primary coupled to ground. The capacitors 16 and 17 are coupled to ground and store voltages of opposite polarities. Specifically, the capacitors 16 and 17 are charged to respectively positive and negative voltages which are approximately equal to peaks of the line voltage. The switch 11 is coupled between line and primary. The switches 12 and 13 are coupled to the capacitors 16 and 17 respectively for applying the voltages of opposite polarities across the primary.

Only one switch is on at a time. The switches 12 and 13 are unidirectional, wherein ordinary MOSFETs can be employed. The switch 11 is bidirectional, wherein a transistor with diode bridge or a pair of transistors with pair of diodes can be used. A switch described in the aforementioned "Switching Circuits Performing Thyristor and Triac Functions" Ser. No. 4,845,391 filed Jul. 4, 1989 by the same inventor is recommended for a superior performance.

When the line voltage is above a positive threshold, the switches 11 and 13 are switched and the switch 12 is open. Similarly, when the line voltage is below a negative threshold, the switches 11 and 12 are switched and the switch 13 is open. When the line voltage is between the positive and negative thresholds, the switches 12 and 13 are switched and the switch 11 is open. In any case voltages of opposite polarities are successively applied across the primary of the transformer 10.

Moreover, the switch 11 is coupled is series with the line voltage and therefore can be switched as to simulate the sinusoidal input current. When the positive and negative thresholds are set to half the peak value of the line voltage, the voltage applied across the primary of the transformer 10 varies in range 2:1. Power failure protection is accomplished by switching the switches 12 and 13 while the switch 11 is open, wherein the capacitors 14 and 15 deliver the energy.

One of the switches 11 thru 13 can be turned on for a fixed period and remain off for any period of time. A minimum switching frequency is limited by determining a maximum pulse width. A control circuit driving the switches 11 thru 13 monitors the line voltage and SPS output voltage, wherein comparators can be employed as to avoid an analog feedback. The current flowing thru the primary can be also monitored by means of a comparator as to determine the short circuit current of the SPS. Another comparator can be employed to compare an average input current of the SPS against expected sine wave sample to control the switch 11.

The switch 11 conducts a current for charging the capacitors 16 and 17. Specifically, the capacitor 16 or 17 is charged when the voltage thereacross is smaller than the line voltage of respective polarity while the switch 11 is closed. The switch 11 also prevents inrush current. When the supply first turns on, the switch 11 remains open until next line voltage crossover. The capacitors 16 and 17 are charged to the peak of the line voltage in several steps since the switch 11 must be switched to avoid a saturation of the transformer 10. The diodes 14 and 15 conduct the currents charging the capacitors 16 and 17 respectively. The diodes 14 and 15 are coupled in parallel with the switches 12 and 13 respectively and also prevent reverse currents therein the any voltage spikes.

The maximum current flowing thru the switch 11 and diodes 14, 15 is determined by the amplitude and frequency of the line voltage, voltage across and capacitance of the capacitor 16 or 17. However, the capacitance is relatively small. The capacitor 16 or 17 is discharged whenever the respective switch 12 or 14 is turned on. For instance, the capacitor 16 or 17 can be discharged when the line voltage is smaller than half the peak value. This occurs 33.3% of the time. The capacitor 16 or 17 is discharged every other half-wave of the line voltage, i.e. 16.7% of the time.

The optional diodes 18 and 19 are coupled to line and further to the capacitors 16 and 17 respectively. Peak currents flowing thru the high speed switch 11 and diodes 14, 15 are reduced. The current from line to the capacitor 16 or 17 flows entirely thru the diode 18 or 19 as the voltage drop thereacross is smaller than across closed switch 11 and diode 14 or 15 respectively. Inrush and surge currents flowing thru the diodes 18 and 19 can be significantly reduced by coupling an inductor in series therewith. Moreover, the switch 11 is open and switches 12 and 13 are switched while the diode 28 or 29 conducts as to better simulate the sinusoidal input current.

Figure 2:
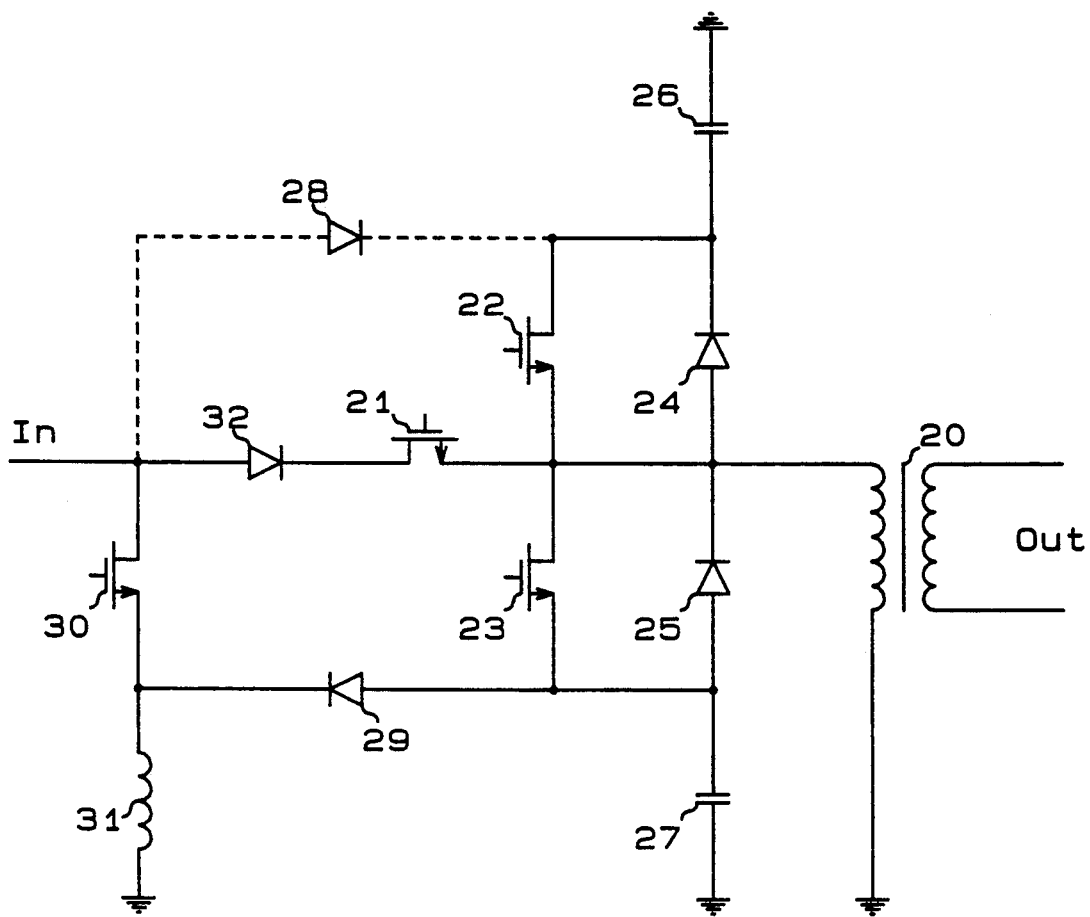
FIG. 2 is embodiment of high power SPS with a switch applying the input signal to the transformer.

FIG. 2 is embodiment of high power SPS with a switch applying the input signal to the transformer. A positive DC input voltage is applied to the SPS, as an example, rectified line voltage. The components 22 thru 28 correspond to 12 thru 18 of FIG. 1 respectively. In particular, the SPS includes the transformer 20 having primary coupled to ground, and secondary providing the output signal. The capacitors 26 and 27 are coupled to ground and store a positive and negative voltages respectively. A switch means comprises the components 22 thru 25 for alternatively applying one or the other voltage to the primary. A rectifying means comprises the components 21, 32 and 28 for rectifying and applying the input signal to the primary and capacitor 26 respectively. A charging means includes a flyback converter for inverting the input voltage polarity and charging the capacitor 27.

The switch means includes a pair of switches coupled to the primary of the transformer 20 and further separately coupled to the pair of the capacitors 26 and 27. Specifically, one switch includes the transistor 22 and diode 24 coupled in parallel therewith. The drain and source of the transistor 22 are coupled to the capacitors 26 and primary respectively. The other switch includes the transistor 23 and diode 25 coupled in parallel therewith. The drain and source of the transistor 23 are coupled to the primary and capacitor 27 respectively. The rectifying means includes a second switch means for applying the input signal to the primary. The second switch means includes transistor 21 and diode coupled in series therewith. The drain and source of the transistor 21 are coupled to the cathode of the diode 32 and primary respectively.

When the input voltage is above a threshold, the transistors 21 and 23 are switched and transistor 22 is off. Otherwise, the transistors 22 and 23 are switched and transistor 21 is off. In any case voltages of opposite polarities are successively applied across the primary of the transformer 20. Only one of the transistors 21 thru 23 is on at a time. The transistor 21 conducts a current for charging the capacitor 26 when the voltage thereacross is smaller than the input voltage. The transistor 21 also prevents inrush current. When the supply first turns on, the transistor 21 remains open until next line voltage crossover, similarly to the switch 11 of FIG. 1. The diode 24 conducts the current charging the capacitor 26.

The maximum current flowing thru the transistor 21 and diodes 24, 32 is determined by the amplitude and frequency of the line voltage, voltage across and capacitance of the capacitor 26. However, the capacitance is relatively small. The capacitor 26 is discharged whenever the transistor 24 is turned on. For instance, the capacitor 26 can be discharged when the line voltage is smaller than half the peak value. This occurs 33% of the time. Therefore, the transistors 21 and 23 are switched most of the time. Consequently, an average current flowing thru the transistor 22 is substantially smaller than an average current flowing thru the transistor 23.

The optional diode 28 is coupled between the input source and capacitor 26. Peak currents flowing thru the transistor 21 and diodes 24, 32 are reduced. The current from the input source to the capacitor 26 flows entirely thru the diode 28. Inrush and surge currents flowing thru the diode 28 can be significantly reduced by coupling an inductor in series therewith. Moreover, the transistor 21 is turned off and transistors 22 and 23 are switched while the diode 28 conducts as to better simulate the sinusoidal input current.

The flyback converter is employed to charge the capacitor 27 to a negative voltage. Specifically, the inductor 31 is coupled to ground for attaining a current. The transistor 30 has drain coupled to the SPS input and source coupled to the inductor 31 for applying the input signal thereto. The diode 29 is conducting the inductor current when the transistor 30 is off, as to charge the capacitor 27. The voltage thereacross does not depend directly on the peak of the input voltage and may be relatively small. If the capacitor voltage and threshold are set to half the peak value of the input voltage, the voltage applied across the primary of the transformer 20 varies in range 2:1. The transistor 30 operates independently of the transistors 21 thru 23. The input current of the SPS is a sum of the currents flowing thru the transistors 21, optional diode 28 and transistors 30. Therefore, sinusoidal input current can be simulated. The power factor is very high.

N-channel MOSFETs are employed as the transistors 21 thru 23 and 30. In particular, drains of the transistors 21 and 22 are tied together which simplifies a driving circuit therefor. The diodes 24 and 25 are coupled in parallel with transistors 22 and 23 respectively to prevent reverse currents therein and any voltage spikes. The diode 32 is coupled in series with the transistor 21 to prevent reverse currents therein. Power failure protection is accomplished by switching the transistors 2 and 23, wherein the capacitors 24 and 25 deliver the energy.

Figure 3:
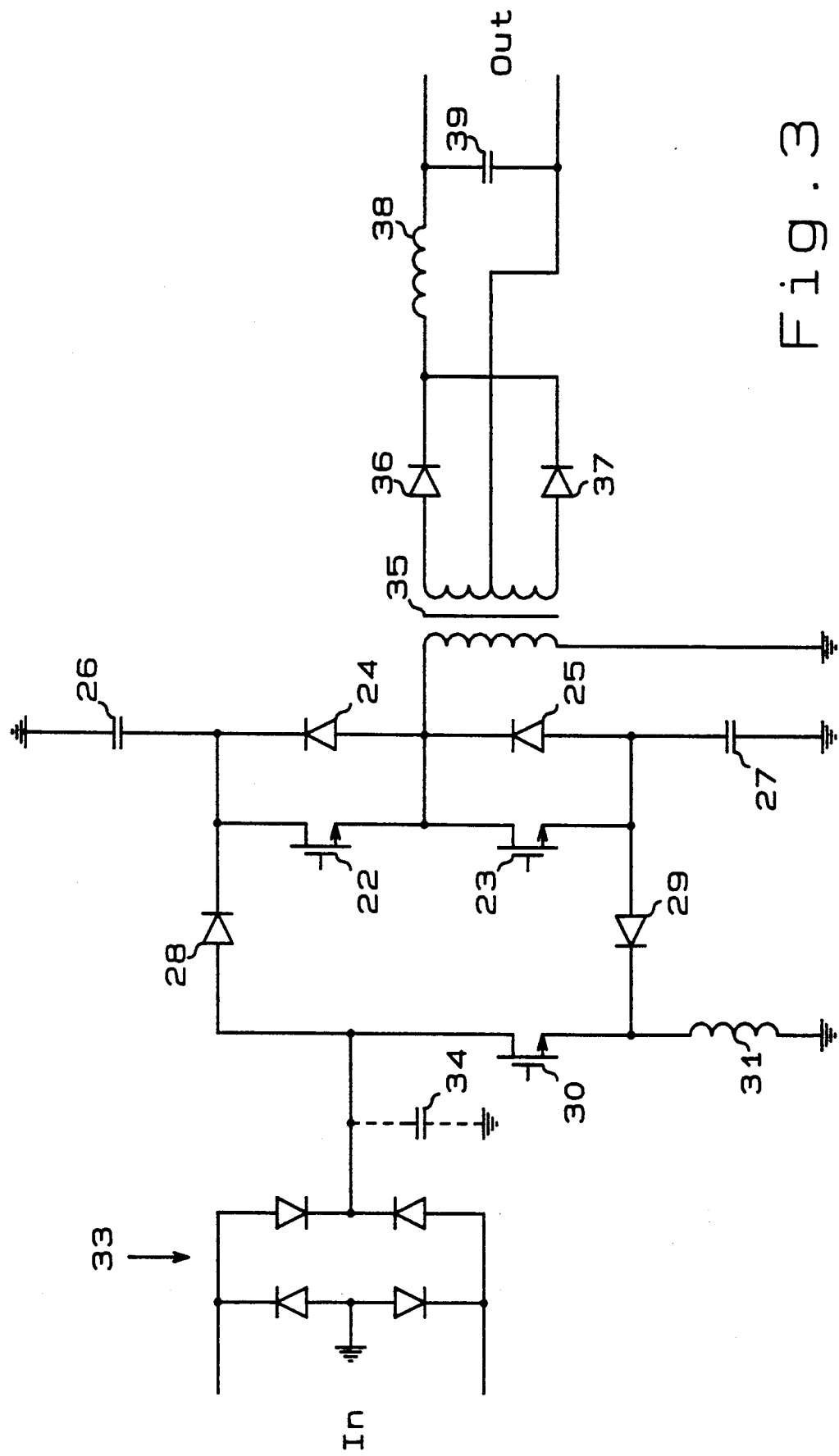
FIG. 3 is preferred embodiment of high power SPS with three transistors.

FIG. 3 is preferred embodiment of high power SPS with three transistors. The input voltage is AC, e.g. line voltage. The diode bridge 33 is coupled in series with the input signal for obtaining a positive rectified voltage. The components 22 thru 31 are the same as in FIG. 1. In particular, the SPS includes the transformer 35 having primary coupled to ground. The capacitors 26 and 27 are coupled to ground and store a positive and negative voltages respectively. The transistors 22 and 23 are switched so that voltages of opposite polarities are successively applied across the primary of the transformer 35. Only one of the transistors 22 or 23 is on at a time.

A charging means includes a flyback converter for inverting the rectified input voltage polarity and charging the capacitor 27 to a negative voltage. The transistor 30 has drain coupled to the diode bridge 33 and source coupled to the inductor 31 for applying the rectified input signal thereacross. The diode 29 is conducting the inductor current when the transistor 30 is off, as to charge the capacitor 27. The voltage thereacross does not depend directly on the peak of the line voltage and may be relatively small, e.g. 50V. If the capacitor voltage is set to half the peak value of the line voltage, the voltage applied across the primary of the transformer 20 varies in range 2:1. The transistor 30 operates independently of the transistors 22 and 23.

A rectifying means comprises the diode 28 for rectifying and applying the rectified input signal to the capacitor 26. The anode and cathode of the diode 28 are coupled to the diode bridge 33 and capacitor 26 respectively. When the rectified input voltage is higher than the voltage stored in the capacitor 26, the diode 28 conducts and the capacitor 26 is charged. Inrush and surge currents flowing thru the diode 28 can be significantly reduced by coupling an inductor in series therewith. However, the input current of the SPS is a sum of the currents flowing thru the diode 28 and transistor 30. The average current flowing therethrough can be reduced to zero while the diode 28 is conducting. Therefore, sinusoidal input current can be simulated. The power factor is very high.

N-channel MOSFETs are employed as the transistors 22, 23 and 30. The diodes 24 and 25 are coupled in parallel with transistors 22 and 23 respectively to prevent reverse currents therein and any voltage spikes. The optional capacitor 34 is coupled between the diode bridge 33 and ground for reducing input current spikes due to the interrupted drain current of the transistor 30. The capacitor 34 has relatively small value so that the rectified line voltage is crudely filtered.

The secondary of the transformer 35 is electromagnetically coupled to the primary and has a center tap coupled to the capacitor 39. The diodes 36 and 37 have anodes coupled to the secondary for rectifying a voltage appearing thereat. The inductor 38 is coupled to cathodes of the diodes 36 and 37 for limiting currents flowing therethrough and reducing output voltage ripple. The capacitor 39 is coupled to the inductor 38 for storing the output voltage of the SPS. The turns ratio of secondary windings is different when the voltages stored in the capacitors 26 and 27 are uneven.

The embodiments of the present invention described herein are intended to be taken in an illustrative and not a limiting sense. Various modifications and changes may be made to these embodiments by persons skilled in the art without departing from the scope of the present invention as defined in the appended claims.

I claim:

1. Switching power supply converting pulsating input voltage into output signal, comprising:
    an inductive means coupled to ground for providing the output signal;
    a pair of capacitive means coupled to ground for storing a pair of voltages having opposite polarities;
    a switch means for alternatively applying one or the other capacitive means voltage to the inductive means;
    a rectifying means for rectifying and applying the input voltage to the inductive means and/or to one capacitive means; and
    a charging means for inverting a polarity of the input voltage and charging the other capacitive means.

2. Switching power supply of claim 1 wherein the inductive means includes a pair of electromagnetically coupled inductors; and
    further including a diode means coupled to one inductor for rectifying a signal appearing thereat and providing the output signal.

3. Switching power supply of claim 2 further including an output capacitive means for storing the output signal.

4. Switching power supply of claim 1 wherein the switch means includes a pair of switches coupled to the inductive means and further separately coupled to the pair of the capacitive means.

5. Switching power supply of claim 4 wherein each switch includes a transistor and diode coupled in parallel therewith.

6. Switching power supply of claim 1 wherein the rectifying means includes a diode means for applying the input voltage to the one capacitive means.

7. Switching power supply of claim 1 wherein the rectifying means includes a second switch means for applying the input voltage to the inductive means.

8. Switching power supply of claim 7 wherein the second switch means includes a transistor and diode coupled in series therewith.

9. Switching power supply of claim 1 wherein the means for charging includes:
    a second inductive means coupled to ground for attaining a current;
    a second switch means for applying the input voltage to the inductive means; and
    a diode means for conducting the current and charging the one capacitive means.

10. Switching power supply of claim 1 further including a diode means for rectifying an AC input signal and providing the input voltage.

11. Switching power supply of claim 1 further including an input capacitive means coupled to the input voltage for reducing input current spikes.

* * * * *